(12) United States Patent
Kawai et al.

(10) Patent No.: US 11,333,073 B2
(45) Date of Patent: May 17, 2022

(54) GAS TURBINE AND THE METHOD OF CONTROLLING BLEED AIR VOLUME FOR GAS TURBINE

(71) Applicant: Mitsubishi Hitachi Power Systems, Ltd., Yokohama (JP)

(72) Inventors: Ryo Kawai, Yokohama (JP); Hiromi Koizumi, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 0 days.

(21) Appl. No.: 16/686,551

(22) Filed: Nov. 18, 2019

(65) Prior Publication Data

US 2020/0158019 A1    May 21, 2020

(30) Foreign Application Priority Data

Nov. 20, 2018  (JP) .............................. JP2018-217363

(51) Int. Cl.
*F02C 7/18*  (2006.01)
*F02C 7/224*  (2006.01)

(52) U.S. Cl.
CPC ................. *F02C 7/18* (2013.01); *F02C 7/224* (2013.01); *F05D 2260/232* (2013.01); *F05D 2270/303* (2013.01)

(58) Field of Classification Search
CPC ............... F02C 7/224; F02C 9/18; F02C 9/52
See application file for complete search history.

(56) References Cited

U.S. PATENT DOCUMENTS 3,858,598 A * 1/1975 Carman ............. G05D 16/2053
                                              137/102
4,794,760 A * 1/1989 White ................... F01D 17/105
                                              251/129.05

(Continued)

FOREIGN PATENT DOCUMENTS

ER    3 246 545 A1    11/2017
JP    2014-47657 A    3/2014

OTHER PUBLICATIONS

German-language Office Action issued in German Application No. 10 2019 217 814.6 dated Jun. 4, 2020 with English translation (14 pages).

*Primary Examiner* — Todd E Manahan
*Assistant Examiner* — Marc J Amar
(74) *Attorney, Agent, or Firm* — Crowell & Moring LLP (57) ABSTRACT

To prevent or reduce an oversensitive change in the degree of opening of a bleed valve regulating the flow volume of a cooling air used to heat a fuel. A gas turbine includes: a compressor compressing an air; a combustor burning a fuel mixed with the air compressed by the compressor; a turbine configured to be driven by a combustion gas generated by the combustor; a heat exchanger causing the fuel to be supplied to the combustor to be heated through a cooling air bled from the compressor to be supplied to the turbine; a bleed valve regulating the flow volume of the cooling air; a first sensor measuring a fuel state value; a second sensor measuring a cooling air state value; and a control computer controlling the degree of opening of the bleed valve. The control computer stores therein data on reference values and dead bands including the corresponding reference value set for each of the fuel state value and the cooling air state value, and, when a measured value of at least one of the fuel state value and the cooling air state value has changed so much away from the corresponding reference value as to fall (Continued)

outside the corresponding dead band, controls the bleed valve such that the changed measured value is brought close to the corresponding reference value.

1 Claim, 5 Drawing Sheets

(56) References Cited

U.S. PATENT DOCUMENTS

| | | | |
|---|---|---|---|
| 6,415,595 B1* | 7/2002 | Wilmot, Jr. | F02C 7/224 60/785 |
| 8,355,819 B2* | 1/2013 | Kirzhner | F02C 9/40 700/274 |
| 8,677,761 B2* | 3/2014 | Leach | F02C 9/18 60/779 |
| 9,759,130 B2* | 9/2017 | Appukuttan | F02C 7/141 |
| 10,815,906 B2* | 10/2020 | Veilleux, Jr | F01P 3/00 |
| 2001/0022087 A1* | 9/2001 | Kobayashi | F02C 7/12 60/736 |
| 2004/0194627 A1* | 10/2004 | Huang | F02C 7/224 96/6 |
| 2005/0150231 A1* | 7/2005 | Laster | F23R 3/40 60/777 |
| 2006/0117757 A1* | 6/2006 | Tanaka | F02C 7/185 60/772 |
| 2010/0058770 A1* | 3/2010 | Ryan | F23R 3/343 60/776 |
| 2010/0215480 A1* | 8/2010 | Leach | F02C 9/18 415/145 |
| 2010/0281870 A1* | 11/2010 | Holt | F02C 7/224 60/736 |
| 2011/0016870 A1* | 1/2011 | Kashler | F02C 7/12 60/772 |
| 2014/0083108 A1* | 3/2014 | Kunihiro | F01K 19/10 60/772 |
| 2014/0131027 A1 | 5/2014 | Chir | |
| 2017/0167307 A1* | 6/2017 | Scipio | F01K 23/10 |
| 2019/0162121 A1* | 5/2019 | Staubach | B64D 13/06 |

* cited by examiner

GAS TURBINE AND THE METHOD OF CONTROLLING BLEED AIR VOLUME FOR GAS TURBINE

BACKGROUND OF THE INVENTION

1. Field of the Invention

The present invention relates to a gas turbine, and, in particular, to a gas turbine in which a fuel to be supplied to a combustor is heated through heat exchange between the fuel and a cooling air bled from a compressor, and a method of controlling the bleed air volume therefor.

2. Description of the Related Art

In a gas turbine, a fuel mixed with a compressed air compressed by a compressor is burned in a combustor to generate a combustion gas as a high-temperature working fluid, and a turbine is driven by the combustion gas. In some gas turbines of this type, a fuel to be supplied to a combustor is heated through heat exchange between the fuel and a compressed air from a compressor in order to improve system heat efficiency by reducing the required fuel flow volume to be supplied to the combustor to generate a combustion gas having a desired temperature, see JP-2014-047657-A and the like.

SUMMARY OF THE INVENTION

In a gas turbine in which a compressed air bled from a compressor is used to cool a turbine, for example, in a case where a fuel is heated through heat exchange between the fuel and the cooling air to be supplied to the turbine, not only an improvement in system heat efficiency but also a reduction in the flow volume of the cooling air can be achieved due to a reduction in the temperature of the cooling air. In this case, performance of the gas turbine can be more properly improved by providing the gas turbine with a bleed valve capable of regulating the flow volume of the cooling air, and controlling the bleed valve in accordance with the temperature of a high-temperature part of the turbine which is to be cooled through the cooling air.

However, the properties of the fuel are not necessarily steady, and the temperature of the cooling air, which undergoes heat exchange with the fuel, may significantly change. Such a change in the temperature of the cooling air leads to a change in the temperature of the high-temperature part of the turbine, and in accordance with the change in the temperature of the high-temperature part of the turbine, the degree of opening of the bleed valve constantly changes. This may result in an unstable flow volume of the cooling air.

An object of the present invention is to provide a gas turbine that is able to prevent or reduce an oversensitive change in the degree of opening of a bleed valve regulating the flow volume of a cooling air used to heat a fuel, and a method of controlling the bleed air volume therefor.

To attain the object mentioned above, a gas turbine according to an embodiment of the present invention includes: a compressor configured to compress an air; a combustor configured to burn a fuel mixed with the air compressed by the compressor to generate a combustion gas; a turbine configured to be driven by the combustion gas generated by the combustor; a heat exchanger configured to cause the fuel to be supplied to the combustor to be heated through a cooling air bled from the compressor to be supplied to the turbine; a bleed valve configured to regulate a flow volume of the cooling air; a first sensor configured to measure at least one state value related to the fuel; a second sensor configured to measure at least one state value related to the cooling air; and a control computer configured to control a degree of opening of the bleed valve. The control computer stores therein data on reference values and dead bands including the corresponding reference value set for measured values of the first sensor and the second sensor, and, when at least one of a measured value measured by the first sensor and a measured value measured by the second sensor has changed so much away from the corresponding reference value as to fall outside of the corresponding dead band, controls the bleed valve such that the changed measured value is brought close to the corresponding reference value.

According to the present invention, it is possible to prevent an oversensitive change in the degree of opening of the bleed valve regulating the flow volume of the cooling air used to heat the fuel.

DESCRIPTION OF THE PREFERRED EMBODIMENTS

Hereinafter, embodiments of the present invention will be described with reference to the accompanying drawings.

First Embodiment

—Gas Turbine—

Figure 1:
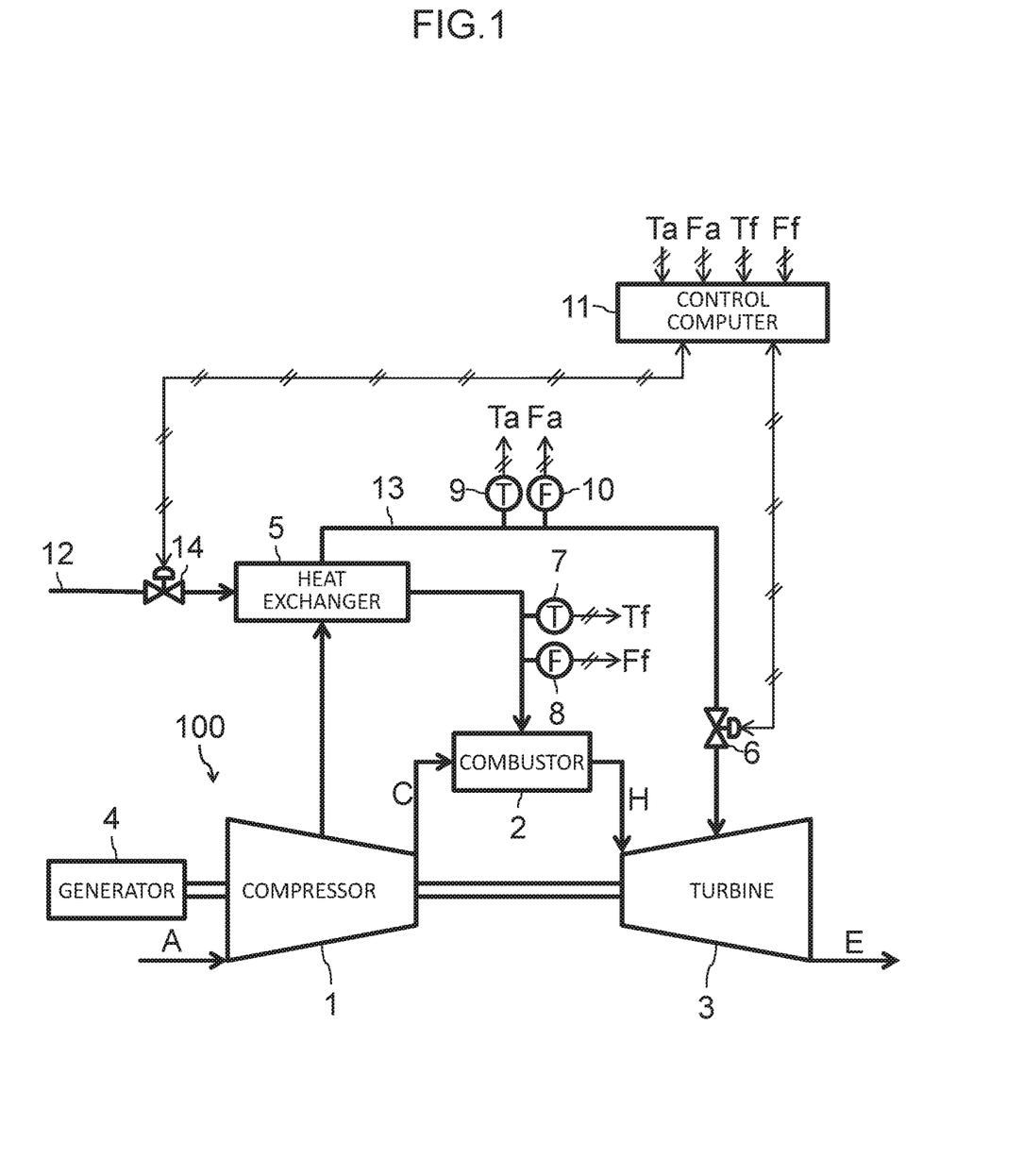
FIG. 1 is a schematic diagram of an example of a gas turbine according to a first embodiment of the present invention.

FIG. 1 is a schematic diagram of an example of a gas turbine according to a first embodiment of the present invention. In the present embodiment, a gas turbine combustor is referred to simply as a combustor. A gas turbine 100 illustrated in FIG. 1 includes a compressor 1, a combustor 2, a turbine 3, load equipment 4, a heat exchanger 5, a bleed valve 6, first sensors 7 and 8, second sensors 9 and 10, and a control computer 11.

The compressor 1 compresses an air A sucked in through an air inlet to generate and discharge a high-pressure compressed air C. The combustor 2 burns a fuel mixed with the compressed air C compressed by the compressor 1 to generate a high-temperature combustion gas H, and supplies the combustion gas H to the turbine 3. The turbine 3 is driven by the combustion gas H generated by the combustor 2. The compressor 1 and the turbine 3 are coaxially connected, and the load equipment 4, e.g., a generator or a pump, is connected to the compressor 1 or the turbine 3. Rotational power obtained by the turbine 3 is partly used as power for the compressor 1, and is partly used as power for the load equipment 4. The combustion gas H, having driven the turbine 3, is exhausted from the turbine 3 as an exhaust gas E.

The heat exchanger 5 is disposed along fuel line (fuel piping) 12 that connects a fuel source (not shown) and the combustor 2, and causes heat exchange between the fuel flowing in the fuel line 12 and a bleed air flowing in bleed line (bleed piping) 13. The bleed line 13 connects an intermediate stage, or an exit, of the compressor 1 and an intermediate stage, or an entrance, of the turbine 3. The bleed air, flowing in the bleed line 13 after being bled from the compressor 1, heats the fuel flowing in the fuel line 12, and correspondingly decreases in temperature, and is then supplied to a high-temperature part of the turbine 3 as a cooling air or a seal air. On the contrary, the fuel flowing in the fuel line 12 increases in temperature due to heat input from the bleed air flowing in the bleed line 13, and is then supplied to the combustor 2.

The bleed valve 6 is a valve device that regulates the flow volume of the cooling air, and is disposed between the heat exchanger 5 and the turbine 3 along the bleed line 13. Note that it may be sufficient if the bleed valve 6 is disposed along the bleed line 13, and that the bleed valve 6 may alternatively be disposed between the heat exchanger 5 and the compressor 1 along the bleed line 13. The bleed valve 6 is driven in response to a signal from the control computer 11, and the degree of opening of the bleed valve 6 is controlled by the control computer 11 to control the flow volume of the bleed air.

Each of the first sensors 7 and 8 is a sensor configured to measure a state value related to the fuel. The state value related to the fuel includes a fuel flow volume Ff, a fuel temperature Tf, and the like. In the present embodiment, the first sensor 7 is a thermometer, while the first sensor 8 is a flow meter. In the illustrated configuration, both the first sensors 7 and 8 are disposed between the heat exchanger 5 and the combustor 2 along the fuel line 12 to measure the state values related to the fuel after the heat exchange is carried out between the fuel and the bleed air in the heat exchanger 5. Note that each of the first sensors 7 and 8 may alternatively be disposed upstream of the heat exchanger 5 along the fuel line 12. Although, in the present embodiment, the flow meter is used as the first sensor 8 to measure the fuel flow volume Ff, the fuel flow volume Ff can alternatively be estimated from the degree of opening of a fuel flow volume regulating valve 14 disposed in the fuel line 12, for example. The degree of opening of the fuel flow volume regulating valve 14 can be measured through an opening meter, and can also be known from a command value of the control computer 11 for the fuel flow volume regulating valve 14. Although the fuel flow volume Ff, the fuel temperature Tf, and the degree of opening of the fuel flow volume regulating valve 14 may all be measured in one possible configuration, all of the above may not necessarily be measured as the state values related to the fuel. It may be sufficient if at least one of the above values is measured. In another possible configuration, the pressure of the fuel may alternatively be measured as a state value related to the fuel, with a pressure gauge disposed in the fuel line 12.

Each of the second sensors 9 and 10 is a sensor configured to measure a state value related to the cooling air, i.e., the bleed air. The state value related to the cooling air includes a cooling air flow volume Fa and a cooling air temperature Ta. In the present embodiment, the second sensor 9 is a thermometer, while the second sensor 10 is a flow meter. In the illustrated configuration, both the second sensors 9 and 10 are disposed between the heat exchanger 5 and the turbine 3 along the bleed line 13 to measure the state values related to the cooling air after the heat exchange is carried out between the fuel and the cooling air in the heat exchanger 5. Note that each of the second sensors 9 and 10 may alternatively be disposed upstream of the heat exchanger 5 along the bleed line 13. Although, in the present embodiment, the flow meter is used as the second sensor 10 to measure the cooling air flow volume Fa, the cooling air flow volume Fa can alternatively be estimated from the degree of opening of the bleed valve 6 disposed in the bleed line 13, for example. The degree of opening of the bleed valve 6 can be measured through an opening meter, and can also be known from a command value of the control computer 11 for the bleed valve 6. Further, although the cooling air flow volume Fa, the cooling air temperature Ta, and the degree of opening of the bleed valve 6 may all be measured in one possible configuration, all of the above may not necessarily be measured as the state values related to the cooling air. It may be sufficient if at least one of the above values is measured. In another possible configuration, the pressure of the cooling air may alternatively be measured as a state value related to the cooling air, with a pressure gauge disposed in the bleed line 13.

The control computer 11 is a controller to control the degree of opening of the bleed valve 6, and has a function to control not only the bleed valve 6 but the whole gas turbine 100. The control computer 11 is provided with a memory and a central processing unit (CPU), and the memory has stored therein data on a reference value, such as a0 or b0 in FIG. 3, and a dead band, which is indicated by a1 and a2, or b1 and b2, in FIG. 3, including the reference value set for a measured value of each of the first sensors 7 and 8 and a measured value of each of the second sensors 9 and 10. It is assumed here that the reference values a0 and b0 and the limit values of the dead bands a1 and a2 and b1 and b2, here $a1<a0<a2$ and $b1<b0<b2$, are set for each of operating conditions, e.g., a partial load operation or a rated load operation. In addition, the control computer 11 loads a program stored in the memory into the CPU and controls the bleed valve 6, when at least one of the measured values including the measured value of each of the first sensors 7 and 8 and the measured value of each of the second sensors 9 and 10 has changed so much away from the corresponding reference value as to fall outside of the corresponding dead band, such that the changed measured value is brought close to the corresponding reference value. Note that the control computer 11 further has a common function to control the fuel flow volume regulating valve 14 in accordance with a start-up schedule or a load command for the gas turbine 100.

—Bleed Valve Control Procedure—

Figure 2:
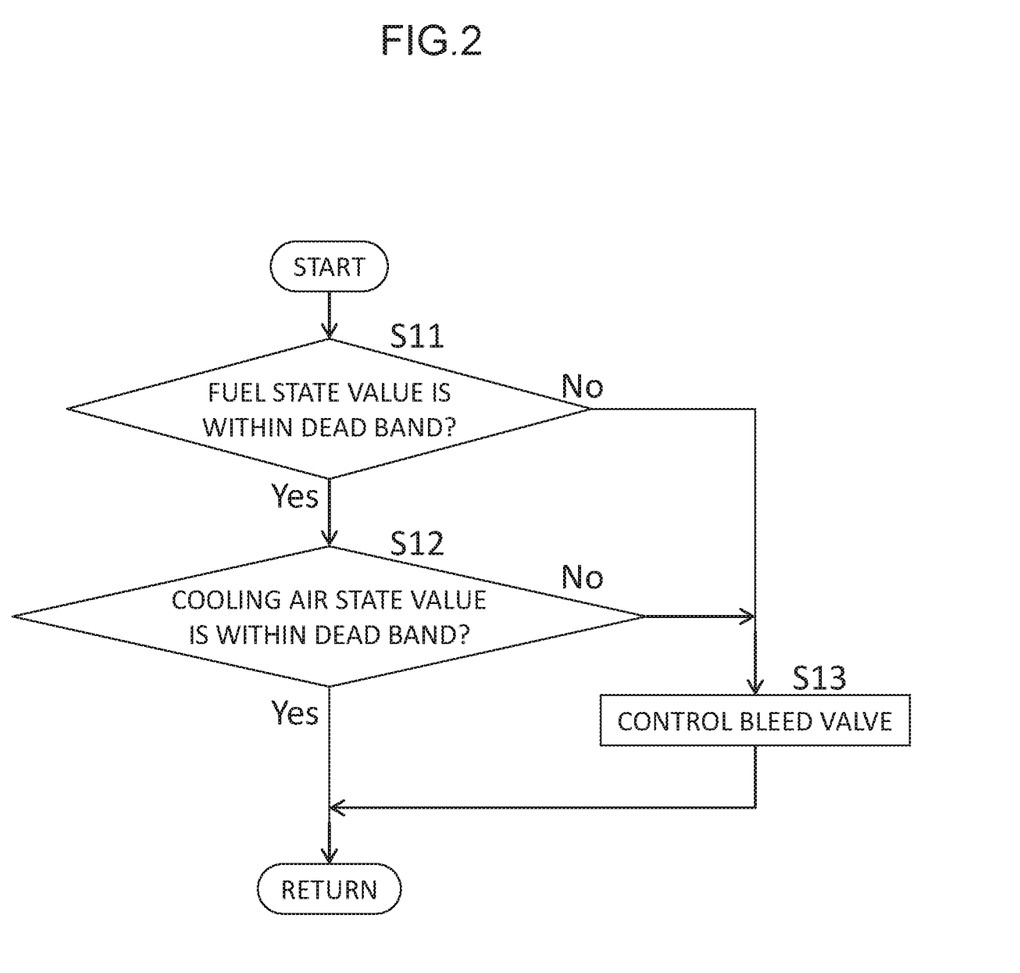
FIG. 2 is a flowchart illustrating a procedure of controlling a bleed valve of the gas turbine according to the first embodiment of the present invention.
Figure 3:
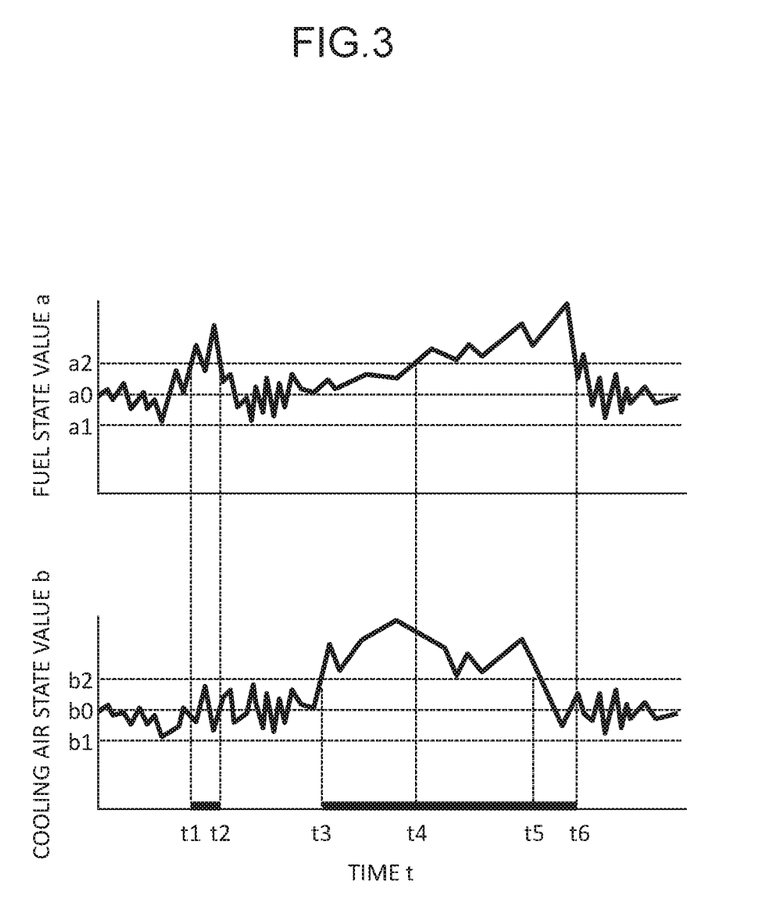
FIG. 3 is a model diagram illustrating changes over time of a fuel state value and a cooling air state value for explaining timing of control of the bleed valve in the gas turbine according to the first embodiment of the present invention.

FIG. 2 is a flowchart illustrating a procedure of controlling the bleed valve of the gas turbine according to the first embodiment of the present invention. FIG. 3 is a model diagram illustrating changes over time of a fuel state value and a cooling air state value for explaining timing of control of the bleed valve in the gas turbine according to the first embodiment of the present invention. After loading the program into the CPU and starting the control illustrated in FIG. 2, the control computer 11 receives input of measurement signals from the first sensors 7 and 8 and the second sensors 9 and 10, and first determines whether the fuel state value a falls within the corresponding dead band, in Step S11. The dead band defines a range which is set for the fuel state value a and which includes the reference value a0. The dead band ranges from the lower limit value of a1 to the upper limit value of a2, that is, a1<a0<a2. The fuel state value a is the measured value of each of the first sensors 7 and 8. In the present embodiment, it is determined whether each of the fuel temperature Tf and the fuel flow volume Ff falls within the corresponding dead band, for example, and it is determined that the fuel state value a falls outside of the corresponding dead band when at least one of the fuel temperature Tf and the fuel flow volume Ff falls outside of the corresponding dead band. Note that it may alternatively be determined that the fuel state value a falls outside of the corresponding dead band only when both values of the fuel temperature Tf and the fuel flow volume Ff fall outside of the corresponding dead bands.

If the fuel state value a falls within the corresponding dead band, the control computer 11 determines whether the cooling air state value b falls within the corresponding dead band, in Step S12. As is the case with the fuel state value a, the dead band defines a range which is set for the cooling air state value b and which includes the reference value b0. The dead band ranges from the lower limit value of b1 to the upper limit value of b2, that is, b1<b0<b2. The cooling air state value b is the measured value of each of the second sensors 9 and 10. In the present embodiment, it is determined whether each of the cooling air temperature Ta and the cooling air flow volume Fa falls within the corresponding dead band, for example, and it is determined that the cooling air state value b falls outside of the corresponding dead band when at least one of the cooling air temperature Ta and the cooling air flow volume Fa falls outside of the corresponding dead band. Note that it may alternatively be determined that the cooling air state value b falls outside of the corresponding dead band only when both values of the cooling air temperature Ta and the cooling air flow volume Fa fall outside of the corresponding dead bands. Further, Steps S11 and S12 may be reversed in order.

If both the fuel state value a and the cooling air state value b are found to fall within the corresponding dead bands as a result of the determinations at Steps S11 and S12, the control computer 11 maintains the present degree of opening of the bleed valve 6, and returns control to Step S11. Meanwhile, if at least one of the fuel state value a and the cooling air state value b has changed so much away from the corresponding reference value as to fall outside of the corresponding dead band, the control computer 11 changes the degree of opening of the bleed valve 6, and returns control to Step S11, in Step S13. In Step S13, the degree of opening of the bleed valve 6 is changed such that the at least one of the fuel state value a and the cooling air state value b which has changed to fall outside of the corresponding dead band is brought close to the corresponding reference value. In the case where the fuel temperature Tf has increased to fall outside of the corresponding dead band, for example, the degree of opening of the bleed valve 6 is reduced to reduce the cooling air flow volume Fa and thus to reduce the fuel temperature Tf. In the case where the cooling air temperature Ta has decreased to fall outside of the corresponding dead band, for example, the degree of opening of the bleed valve 6 is increased to increase the cooling air flow volume Fa and thus to increase the cooling air temperature Ta.

In the case of the example of FIG. 3, the fuel state value a falls outside of the corresponding dead band during a period of time from t1 to t2. In addition, the cooling air state value b falls outside of the corresponding dead band during a period of time from t3 to t4, and both the fuel state value a and the cooling air state value b fall outside of the corresponding dead bands during a period of time from t4 to t5. Thereafter, the cooling air state value b returns into the corresponding dead band at time t5, and only the fuel state value a falls outside of the corresponding dead band during a period of time from t5 to t6. Both the fuel state value a and the cooling air state value b fall within the corresponding dead bands before time t1, during a period of time from t2 to t3, and after time t6. In this case, the degree of opening of the bleed valve 6 is maintained before time t1, during the period of time from t2 to t3, and after time t6, while the degree of opening of the bleed valve 6 is controlled for compensation during the periods of time from t1 to t2 and from t3 to t6.

—Advantageous Effects—According to the present embodiment, an effect of improving system heat efficiency can be achieved by heating the fuel through the heat exchange between the fuel and the cooling air bled from the compressor 1 to be supplied to the turbine 3. In addition, the temperature of the cooling air used to cool the turbine is reduced through the heat exchange between the fuel and the cooling air, thus a reduction in the flow volume of the cooling air is enabled to make it possible to properly improve the performance of the gas turbine by controlling the degree of opening of the bleed valve 6 in accordance with the temperature of the high-temperature part of the turbine which is to be cooled.

In particular, in the case of the present embodiment, the dead bands are provided for the fuel state value a and the cooling air state value b for controlling the bleed valve 6 on the basis of the fuel state value a and the cooling air state value b. Accordingly, even if a fluctuation in temperature change of the high-temperature part of the turbine occurs due to unstable properties of the fuel, the degree of opening of the bleed valve 6 does not change in an oversensitive manner. Thus, an oversensitive change in the degree of opening of the bleed valve 6 can be prevented to reduce a fluctuation in the flow volume of the cooling air.

—Method of Controlling Flow Volume of Bleed Air—

The data on the reference value and the dead band including the reference value is determined in advance for each of the fuel state value and the cooling air state value, and when at least one of the fuel state value and the cooling air state value has changed so much away from the corresponding reference value as to fall outside of the corresponding dead band, the bleed valve is operated such that the changed state value is brought close to the corresponding reference value. Use of this method leads to preventing an oversensitive change in the degree of opening of the bleed valve regulating the flow volume of the cooling air, which is used to heat the fuel, as described above. Although it has been assumed in the first embodiment, as in a second embodiment which will be described below, that the above method is implemented by the control computer 11, the same or similar advantageous effects can be achieved also by, for example, manually operating the bleed valve 6 by an operator in a control room if it is possible to monitor the fuel state value and the cooling air state value. In this case, the control computer 11 may not necessarily be capable of controlling the bleed valve as illustrated in FIG. 2.

Second Embodiment

Figure 4:
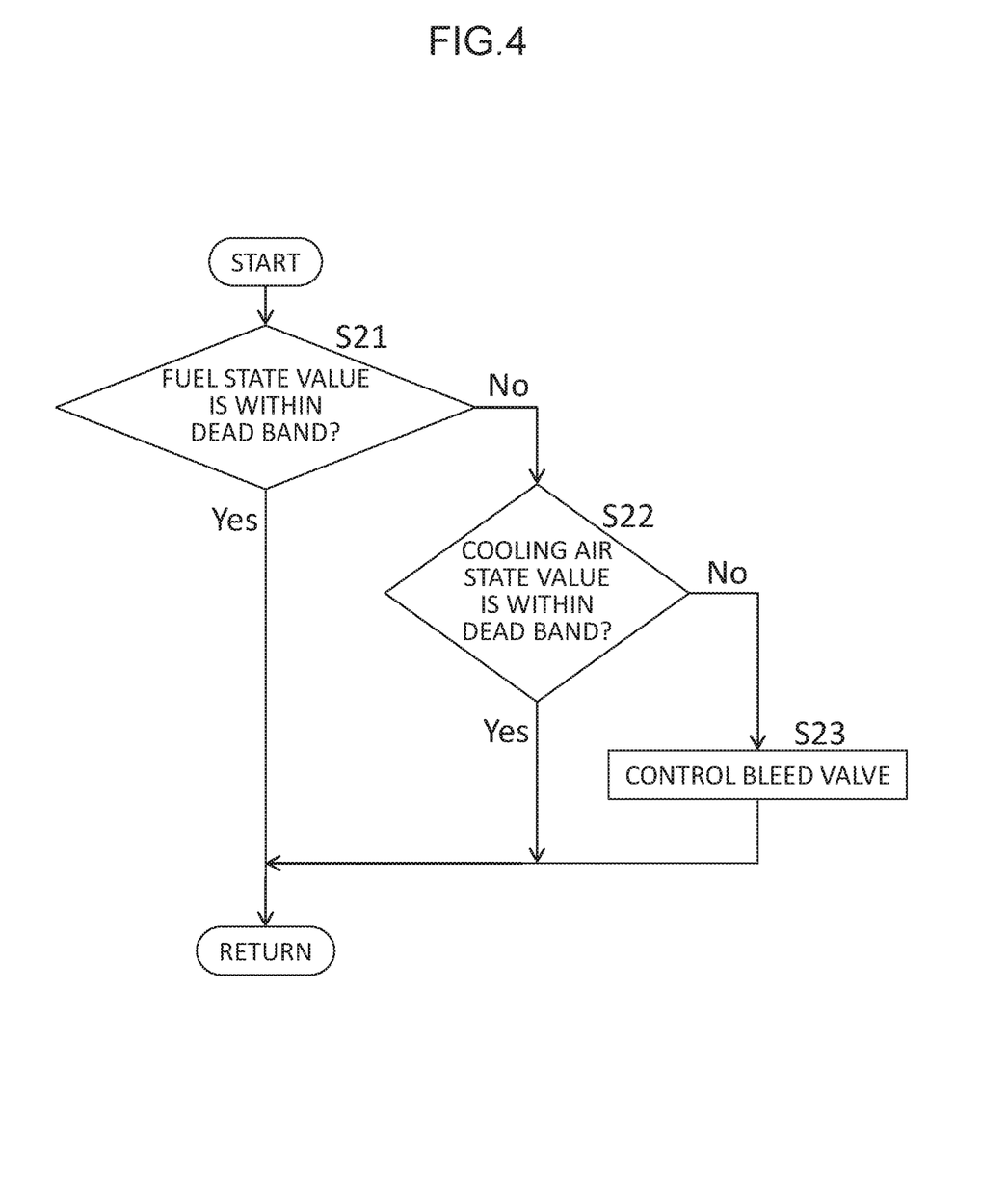
FIG. 4 is a flowchart illustrating a procedure of controlling a bleed valve of a gas turbine according to a second embodiment of the present invention.
Figure 5:
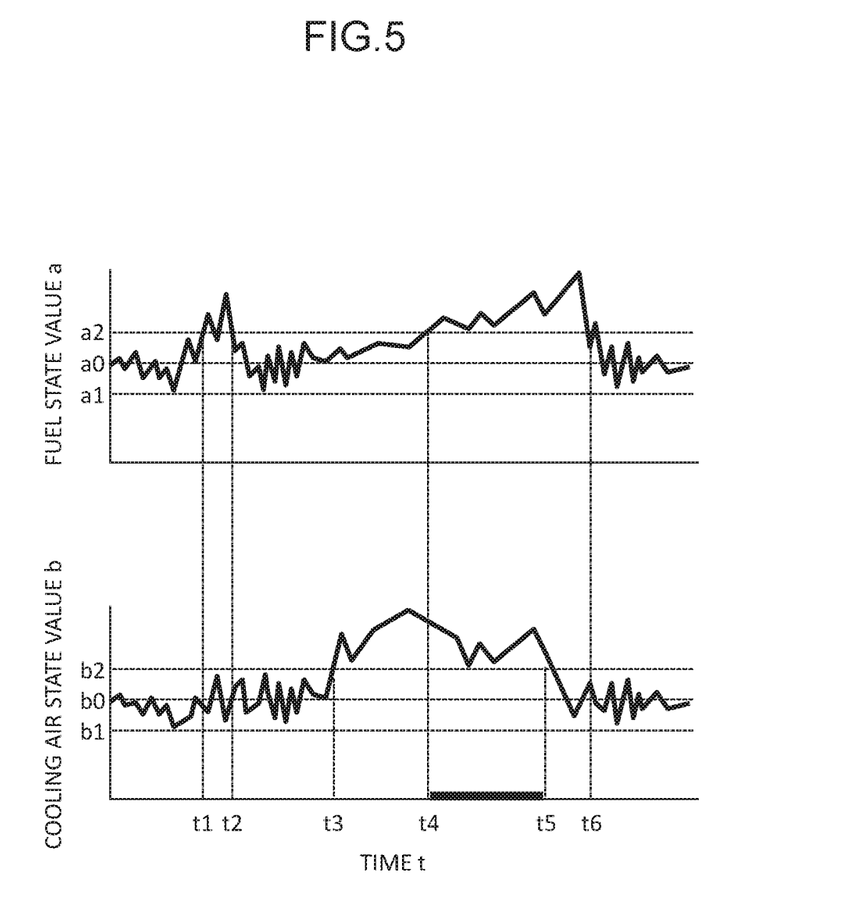
FIG. 5 is a model diagram illustrating changes over time of a fuel state value and a cooling air state value for explaining timing of control of the bleed valve in the gas turbine according to the second embodiment of the present invention.

FIG. 4 is a flowchart illustrating a procedure of controlling a bleed valve of a gas turbine according to the second embodiment of the present invention. FIG. 5 is a model diagram illustrating changes over time of a fuel state value and a cooling air state value for explaining timing of control of the bleed valve in the gas turbine according to the second embodiment of the present invention. FIGS. 4 and 5 correspond to FIGS. 2 and 3, respectively. The present embodiment is different from the first embodiment in that the control of changing the degree of opening of the bleed valve 6 is performed only when both the fuel state value a and the cooling air state value b have fallen outside of the corresponding dead bands, and is similar in hardware configuration to the first embodiment.

After loading the program into the CPU and starting the control illustrated in FIG. 4, the control computer 11 receives input of measurement signals from the first sensors 7 and 8 and the second sensors 9 and 10, and first determines whether the fuel state value a falls within the corresponding dead band, in Step S21. If the fuel state value a falls outside of the corresponding dead band, the control computer 11 determines whether the cooling air state value b falls within the corresponding dead band, in Step S22. If at least one of the fuel state value a and the cooling air state value b is found to fall within the corresponding dead band as a result of the determinations at Steps S21 and S22, the control computer 11 maintains the present degree of opening of the bleed valve 6, and returns control to Step S21. Meanwhile, if both of the fuel state value a and the cooling air state value b have changed so much away from the corresponding reference values as to fall outside of the corresponding dead bands, the control computer 11 changes the degree of opening of the bleed valve 6, and returns control to Step S21, in Step S23. Individual processes performed in Steps S21, S22, and S23 are similar to the processes performed in Steps S11, S12, and S13, respectively, in FIG. 2.

In the case of the example of FIG. 5, as in the case of the example of FIG. 3, the fuel state value a falls outside of the corresponding dead band during a period of time from t1 to t2. In addition, the cooling air state value b falls outside of the corresponding dead band during a period of time from t3 to t4, and both the fuel state value a and the cooling air state value b fall outside of the corresponding dead bands during a period of time from t4 to t5. Thereafter, the cooling air state value b returns into the corresponding dead band at time t5, and only the fuel state value a falls outside of the corresponding dead band during a period of time from t5 to t6. Both the fuel state value a and the cooling air state value b fall within the corresponding dead bands before time t1, during a period of time from t2 to t3, and after time t6. In this case, the degree of opening of the bleed valve 6 is maintained before time t4 and after time t5, while the degree of opening of the bleed valve 6 is controlled for compensation during the period of time from t4 to t5.

The present embodiment is also able to achieve advantageous effects similar to those of the first embodiment. In addition, since the degree of opening of the bleed valve 6 is changed only when both the fuel state value a and the cooling air state value b fall outside of the corresponding dead bands, the change in the degree of opening of the bleed valve can be reduced compared to the first embodiment. One of the first embodiment and the second embodiment may be selected for use as appropriate.

Modifications

While, in FIG. 1, a single-shaft gas turbine is illustrated as a gas turbine according to an embodiment of the present invention, the same or similar advantageous effects can be achieved when the present invention is applied to other types of gas turbines. The present invention is also applicable to, for example, a twin-shaft gas turbine having a high pressure turbine connected to a compressor, and a low pressure turbine separated from the high pressure turbine and connected to load equipment, and in this case also, the same or similar advantageous effects can be achieved. In addition, in one embodiment of the present invention, the mode of the control according to the first embodiment and the mode of the control according to the second embodiment may be provided as a first mode and a second mode, respectively, for example, with the control mode of the bleed valve 6 being manually switchable therebetween via a switch operation, for example.

What is claimed is:

1. A gas turbine comprising:
   a compressor configured to compress an air;
   a combustor configured to burn a fuel mixed with the air compressed by the compressor to generate a combustion gas;
   a turbine configured to be driven by the combustion gas generated by the combustor;
   a heat exchanger configured to cause the fuel to be supplied to the combustor to be heated through a cooling air bled from the compressor to be supplied to the turbine;
   a bleed valve configured to regulate a flow volume of the cooling air;
   a first sensor configured to measure a state value related to the fuel;
   a second sensor configured to measure a state value related to the cooling air; and
   a control computer configured to control a degree of opening of the bleed valve, wherein
      the control computer stores therein reference values and dead bands that are set for each of measured state values of the first sensor and the second sensor, and, when at least one of a measured state value measured by the first sensor and a measured state value measured by the second sensor has changed so much away from the corresponding reference value as to fall outside of the corresponding dead band, controls the bleed valve such that the changed measured state value is brought within the corresponding dead band,
      the state value related to the cooling air includes a cooling air temperature, and
      the control computer is configured to increase the degree of opening of the bleed valve to increase the cooling air flow volume in the case where the cooling air temperature has decreased to fall outside of the corresponding dead band.

\* \* \* \* \*